United States Patent [19]

Herpe

[11] Patent Number: 5,114,045
[45] Date of Patent: May 19, 1992

[54] METHOD AND AN INSTALLATION FOR CONSERVING AND/OR DISPENSING A LIQUID OR SEMI-LIQUID SUBSTANCE

[75] Inventor: Michel Herpe, Orsay, France
[73] Assignee: Bongrain S.A., Guyancourt, France
[21] Appl. No.: 427,187
[22] Filed: Oct. 26, 1989
[30] Foreign Application Priority Data Oct. 28, 1988 [FR] France .................. 8814149

[51] Int. Cl.⁵ .............................................. B65D 35/56
[52] U.S. Cl. .................... 222/105; 222/146.6; 222/318; 222/564
[58] Field of Search ................ 222/1, 94, 131, 146.1, 222/146.2, 146.3, 146.6, 105, 226, 266, 209, 318, 325, 459, 212, 214, 504, 190, 107, 564; 426/519, 565, 474

[56] References Cited

U.S. PATENT DOCUMENTS

| | | | |
|---|---|---|---|
| 2,718,985 | 9/1955 | Tamminga | 222/131 |
| 3,117,695 | 1/1964 | Cox | 222/131 |
| 3,185,348 | 5/1965 | Pollak et al. | 222/146.1 |
| 3,920,163 | 11/1975 | Brown | 222/190 |
| 4,004,040 | 1/1977 | Puta | 426/474 |
| 4,537,332 | 8/1985 | Brown et al. | 222/190 |
| 4,708,266 | 11/1987 | Rudick | 222/518 |
| 4,753,370 | 6/1988 | Rudick | 222/214 |
| 4,955,508 | 9/1990 | Capanna et al. | 222/94 |

FOREIGN PATENT DOCUMENTS

| | | | |
|---|---|---|---|
| 0053813 | 6/1982 | European Pat. Off. | |
| 904380 | 8/1962 | United Kingdom | 222/146.6 |

Primary Examiner—Michael S. Huppert
Assistant Examiner—Kenneth Bomberg
Attorney, Agent, or Firm—Bell, Seltzer, Park & Gibson

[57] ABSTRACT

A method and an installation for conserving and/or dispensing a liquid or semi-liquid substance (P) released in a deformable flexible bag (s). The substance may be extracted from the bag by actuating and appropriate drawing-off dust (12), with the substance being drawn off via the duct (50) which remains closed so long as the bag (s) is not in place in a conservation and/or dispensing apparatus. While the bag is in the apparatus, and so long as the bag is not entirely empty, the substance is circulated by a pump round a closed loop circuit which extends in part outside the bag, with the circuit being set up when the bag (s) is put into place in the conservation and/or dispensing apparatus.

15 Claims, 6 Drawing Sheets

METHOD AND AN INSTALLATION FOR CONSERVING AND/OR DISPENSING A LIQUID OR SEMI-LIQUID SUBSTANCE

The invention relates to a method and an installation for conserving and/or dispensing a liquid or a semi-liquid substance.

BACKGROUND OF THE INVENTION

Numerous embodiments are already known of installations for dispensing individual portions of a liquid on request (see for example European patent EP-A-O 252 420) or for dispensing portions of a semi-liquid condiment (see for example British patent GB-A-2 154 204), or a fresh milk product such as yogurt (see for example French patent FR-A-2 562 053). In the installation described in the French patent, a refrigerated volume is filled with liquid yogurt and means are provided for causing a portion of yogurt to flow on request from the supply to a mixer in which flavoring is added thereto prior to transferring the portion into a mixture-receiving beaker. The refrigerated volume and the various circuits are periodically cleaned by a spray of cleaning liquid followed by one or more flushing substances. In order to avoid drawbacks presented by these essential cleaning operations, the installations described in the first two above-mentioned patents relating respectively to carbonated drinks and to seasoning sauces, make use of a flexible tank which encloses the substance to be dispensed, with the substance being extracted by gravity if liquid and by mechanical action if a sauce. Such prior devices making use of a flexible pocket or bag are referred to in the art as "bag-in-a-box" devices and they have also been suggested for dispensing unit portions of liquids or semi-liquid substances as throwaway tanks from which the contents can be withdrawn via a flexible dispensing tube after the bag has been put into a machine including means for refrigerating the contents of the bag (see EP-A-0 152 283). In another prior device, the contents of the deformable pocket or bag is withdrawn by means of a peristaltic pump (see EP-A-0 053 813, for example).

Although the dispensing of liquids and some semi-liquid substances using a device such as that described in abovementioned European patent EP-A-0 053 813 does not present difficulties, the device is not designed to conserve the substance and is therefore unsuitable for dispensing fresh milk products such as yogurt or for dispensing certain other products (food products or otherwise) which are subject to syneresis or which lose their characteristics of uniformness, as applies, for example, to emulsions which separate out into several different phases during prolonged storage in the dispensing installation or apparatus.

Consequently, a general object of the present invention is to provide a method and an installation which are particularly well adapted to conserving and/or dispensing substances which are liquid or semi-liquid and which have properties of texture, uniformness, thickness, viscosity, rheology, and stability, (and also organoleptic properties when dealing with food products) that are liable to change significantly during the storage which precedes their being dispensed.

As a result, an object of the invention is to provide a method and an apparatus for conserving and/or dispensing a liquid or semi-liquid product in the form of unit portions, with utilization of the method and the apparatus being particularly simple, in particular in that they avoid the need for cleaning the storage means for the substance to be dispensed, as is necessary in certain prior art installations.

Another object of the invention is to provide a method and an apparatus suitable for use both in dispensing substances that are delivered at ambient temperature and substances which are delivered at a temperature which is higher or lower than ambient.

In this respect, another object of the invention is to provide a method and an apparatus also making it possible to deliver a substance whose texture, thickness, and organoleptic characteristics are different from those of the substance or substances as stored.

Finally, another object of the invention is to provide a method and an apparatus well suited to conserving and/or dispensing medicinal or food products for which it is essential not only to satisfy conditions of hygiene, but also more severe septic conditions providing protection against microbes, germs, or the like.

SUMMARY OF THE INVENTION

The present invention provides a method of conserving and/or dispensing a liquid or semi-liquid substance enclosed in a deformable flexible bag from which it may be extracted by actuating appropriate drawing-off means and which is circulated by a pump so long as the bag is not entirely empty round a closed loop circuit which extends in part outside said bag, said circuit being established when said bag is put into place in a conservation and/or dispensing apparatus, wherein the substance is drawn off via a duct which remains closed so long as the said bag is not in place in said conservation and/or dispensing apparatus.

As a result the flexible bag can be filled with the substance to be dispensed under the best possible hygienic and aseptic conditions, and these conditions are conserved throughout the entire time taken to extract the substance from the bag.

Heater or cooler means for heating or cooling the substance to be conserved and/or dispensed may be associated with said closed loop circuit.

The drawing-off duct may be associated with means suitable for modifying the texture and/or the thickness and/or the organoleptic characteristics of the substance conserved in the flexible bag, such as an expander and refrigeration device, for example, making it possible to obtain and dispense individual portions of frozen yogurt -from a supply of liquid or semi-liquid yogurt.

The present invention also provides an installation for conserving and/or dispensing a liquid or semi-liquid substance from a supply of said substance enclosed in a deformable flexible bag from which the said substance can be extracted by appropriate drawing-off means, with branch means being associated with the supply of substance and pump means for causing the substance contained in the supply to circulate around a closed loop located in part outside said deformable flexible bag, wherein the drawing-off means is suitable for co-operating with a duct connected to the supply of substance and having its free end closed so long as the bag is not put into place in the installation.

In a preferred embodiment of the invention, in which the branch means establishing the circulation loop for the substance to be conserved and/or dispensed are constituted by a flexible pipe or tube connected to two endpieces of the flexible bag, and in which the pump means are constituted by a peristaltic pump suitable for co-operating with said flexible pipe or tube, one of the endpieces connected to the flexible pipe or tube through which the substance to be conserved and/or dispensed contained in the flexible bag circulates, is also connected to said duct with which unit portion drawing-off means co-operate, e.g. a manually or automatically actuated faucet or the like.

An aseptic barrier device may be associated with the drawing-off means.

In order to further facilitate utilization of an installation of the invention, a particularly advantageous embodiment provides that the flexible bag enclosing the substance to be conserved and/or dispensed is received in the installation by means of a box provided with members for positioning the endpiece connected to the drawing-off duct.

Organizing the installation in this way makes it possible to adjust the temperature of the conserved and/or dispensed substance in a particularly advantageous manner, and most simply by associating heater means or cooler means with the flexible tube for continuously or discontinuously taking substance out from the flexible bag.

In a particularly advantageous embodiment, the installation further includes means for modifying the texture, the uniformness, and/or the organoleptic qualities, ..., etc. of the substance contained in the flexible bag, e.g. an expander and refrigerator device which may be connected to the supply drawing-off duct, thereby enabling individual portions of frozen yogurt to be dispensed from a supply of liquid or semi-liquid yogurt.

The invention also provides flexible refills suitable for being used in an installation as defined above, i.e. comprising at least two endpieces which are distant from each other and which are interconnected outside the bag by a flexible tube or pipe enabling the substance to be conserved and/or dispensed to flow around a closed loop, together with at least one duct associated with the flexible bag for drawing-off the contents of the refill with the end of the duct remote from the bag being closed until said drawing-off begins.

In a preferred embodiment of such a flexible refill, the refill is compartmentalized, which can most simply be done by define a sinuous flow path inside the bag itself for the substance to be conserved and/or dispensed.

BRIEF DESCRIPTION OF THE DRAWINGS

Embodiments of the invention are described by way of example with reference to the accompanying drawings, in which.

DETAILED DESCRIPTION

In order to conserve and/or dispense a liquid or semi-liquid substance P, the invention proposes using a flexible bag s of the type used in packaging technology for so-called "bag-in-a-box" systems where the bags are discardable flexible pockets or envelopes based on one or more films of polyethylene or similar plastic materials selected as a function of their protective properties and also as a function of their suitability for conserving their contents while remaining innocuous relative thereto. In accordance with the invention, the flexible bag a for being fitted to an installation for conserving and/or dispensing substance as described in greater detail below, itself includes two endpieces 10 and 11 which are interconnected outside the bag via a duct such as a flexible pipe or tube 13.

Figure 1:
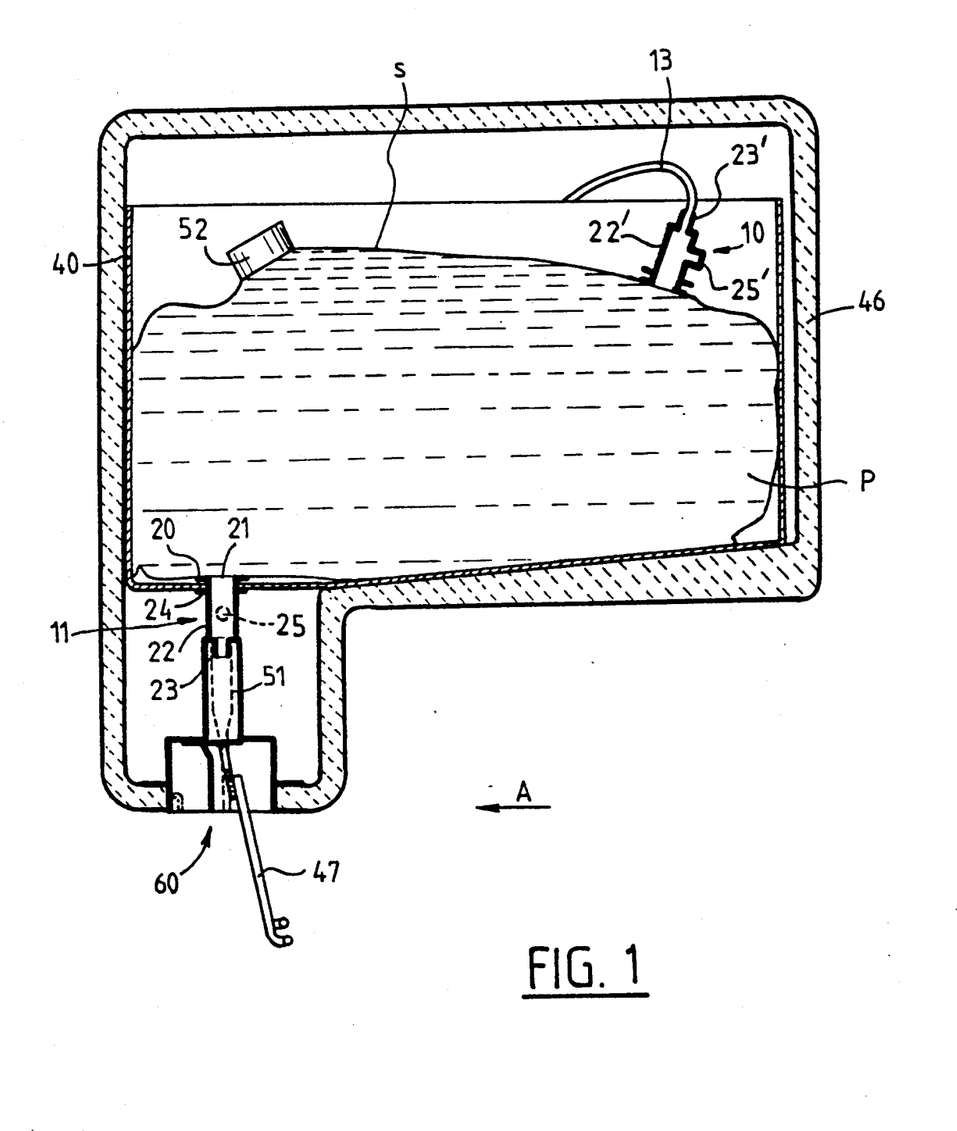
FIG. 1 is a diagrammatic section view of a portion of an installation in accordance with the invention.

More precisely, endpiece 11 includes a base 20 for fixing to the bag s and pierced by a central orifice 21, together with a sleeve 22 having the same diameter as the orifice 21 and terminating at its end opposite to said orifice in a nipple 23. The sleeve 22 has a flange 24 extending substantially parallel to the base 20 and at a short distance therefrom, and also a second nipple 25 extending substantially perpendicularly to the axis X of the sleeve.

The endpiece 10 is identical to the endpiece 11 and its component parts bear the same references plus the prime symbol '.

In accordance with the invention, the nipple 23' of the endpiece 10 is connected by the flexible pipe or tube 13 to the nipple 25 of the endpiece 11, thereby defining a path outside the bag s along which the substance P can flow in a closed loop between endpieces 10 and 11.

Figure 4:
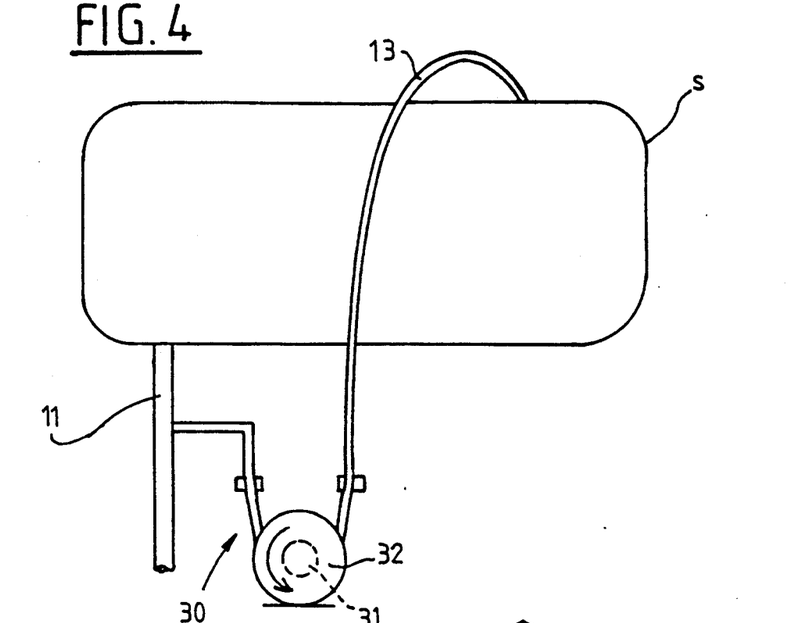
FIG. 4 is a diagram illustrating the method of the invention.

In order to cause the substance P to move around this closed loop circuit, the invention provides for associating the flexible pipe or tube 13 with a pump 30, advantageously a peristaltic pump, the pump being suitable for being driven intermittently or continuously by a motor 31. To do this, and as shown in FIG. 4, the flexible pipe or tube 13 is merely put into place around the rotor 32 of the peristaltic pump and then switching on the motor 31 causes the substance P to flow from endpiece 11 to endpiece 10, and non-return valve means (not shown) may optionally be interposed at the outlet of the pump 30.

Figure 2:
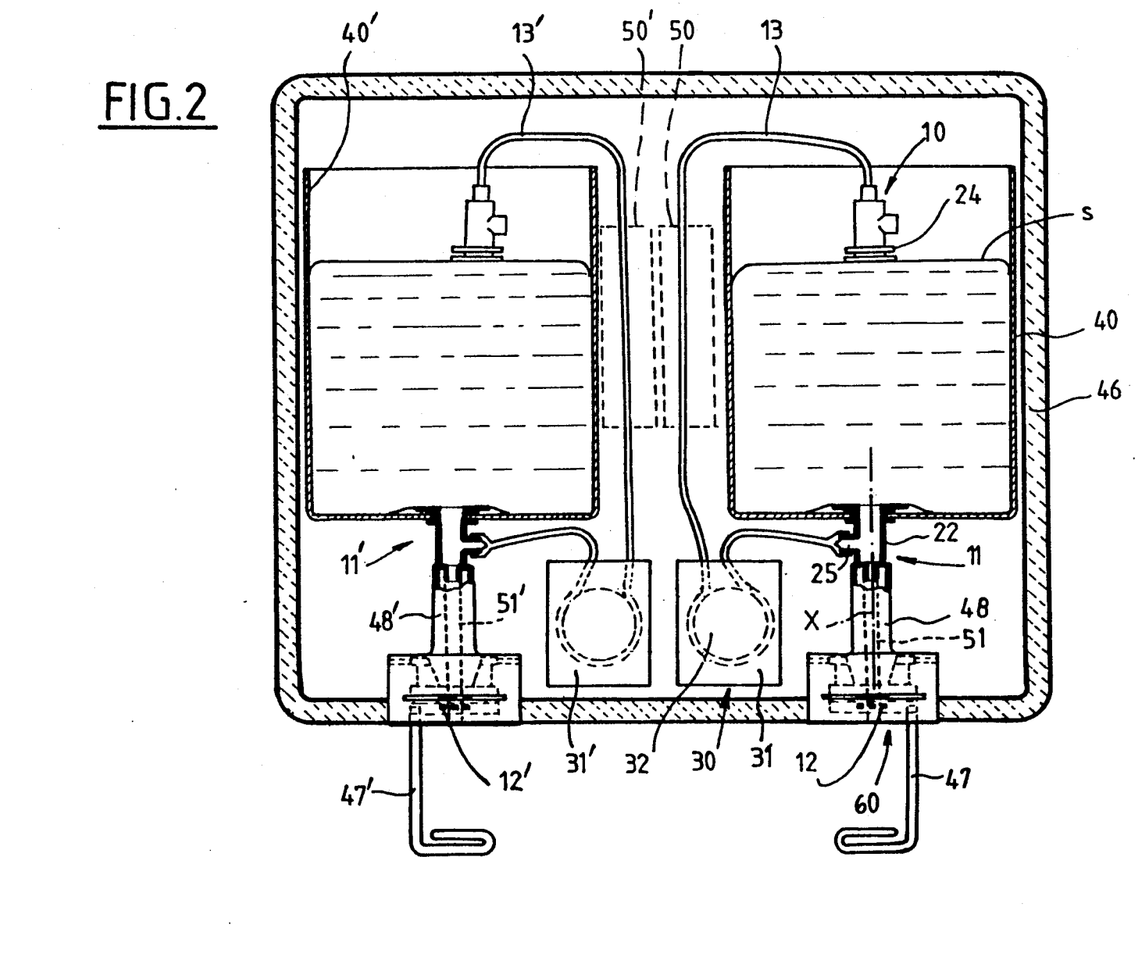
FIG. 2 is a diagrammatic view of an installation of the invention as seen along arrow A of FIG. 1.
Figure 3:
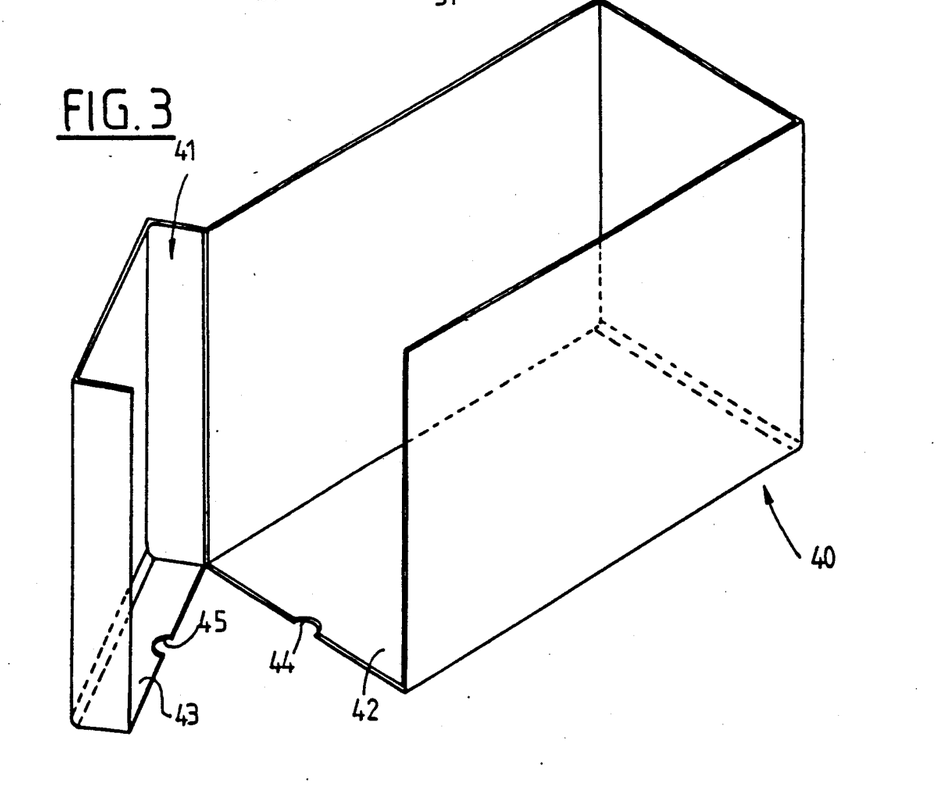
FIG. 3 is a diagrammatic perspective view of a bag-receiving box suitable for being fitted in an installation of the invention.

In order to facilitate utilization of an installation of the invention, provision is also made for associating a box or tank 40 therewith as shown in FIGS. 2 and 3, the box being provided with a pivoting door 41 and the bottom of the box 42 and the bottom 43 of the door include cut-outs 44 and 45 respectively enabling the endpiece 11 to be positioned therein by the notches clamping around the sleeve 22 between the base 20 and the flange 24.

In the embodiment of the invention shown in FIG. 2 which constitutes an installation for dispensing unit portions of the substance P, the installation has two boxes 40 or 40' contained in an isothermal enclosure 46 which also includes drawing-off means 12 and 12' (such as faucets having actuator arms 47 and 47' belonging to conventional dispensing units 48 and 48'), co-operating with ducts 51 and 51' connected to the endpieces 11 and 11' respectively. As also shown in FIGS. 1 and 2, the dispensing installation is advantageously provided with an aseptic barrier device 60.

When an installation of the invention is intended to conserve and/or dispense one or more substances at a temperature which is higher than or lower than ambient temperature, heater means or cooling means as represented diagrammatically in FIG. 2 at 50 and 50' may be associated with the pipes or tubes 13 and 13' of each of the supplies of substance to be dispensed.

The steps of the method and the operation of an installation of the invention stem directly from the above description.

The substance to be conserved and/or dispensed, e.g. yogurt or any other liquid or semi-liquid food or medicinal substance (without taking these possibilities to be limiting in any way) is initially inserted into the bag s via a filling point 52 and while taking all the usual hygienic and aseptic precautions, and the bag is then sealed, the bag having previously been provided with its endpieces 10 and 11, with the flexible pipe or tube 13 interconnecting them, and with the duct 51 whose end remote from the bag is closed.

Where appropriate, one or more inert gas(es) is/are inserted into the bag at the end of the filling operation.

The bag s is then put into place in the box 40, with the duct 51 whose end distant from the endpiece 11 is closed projecting outside from said box.

After the bag s has been put into place in the box 40, which is done most simply by opening the door 41 and placing the sleeve 22 in the notches 44 and 45, the flexible pipe or tube 13 is placed in the peristaltic pump 30, the duct 51 is opened and connected to units such as 48 associated with the drawing off faucet 12, and the aseptic barrier device 60 is put into place. The pump 30 is then switched on and the substance P to be conserved and/or dispensed is caused to move continuously or intermittently outside the bag s and through the bag, thereby ensuring that the said substance retains its properties of texture, uniformness, thickness, viscosity, etc. throughout its lifetime, as is essential for conserving its organoleptic characteristics if the substance is a food product.

Figure 5:
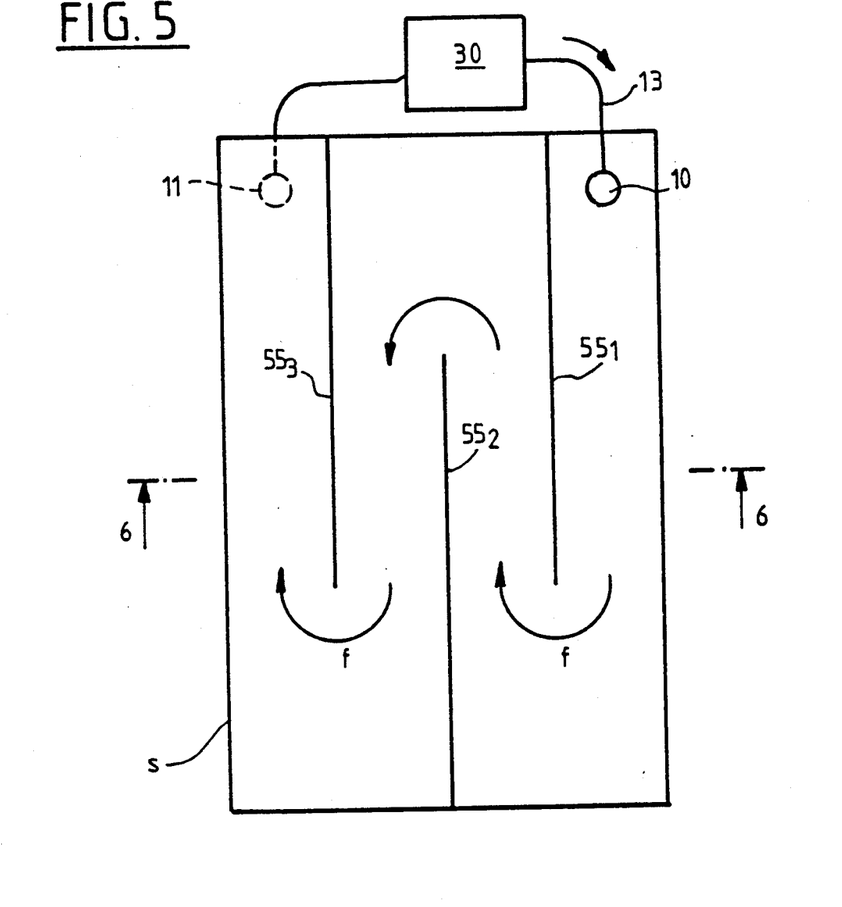
FIG. 5 is a diagrammatic view of a preferred embodiment of a flexible bag containing a supply of substance to be dispensed.
Figure 6:
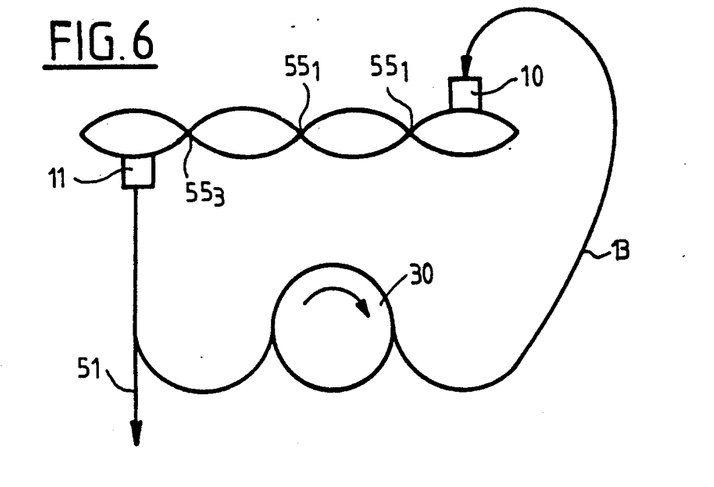
FIG. 6 is a section view on line 6—6 of FIG. 5.

In order to further improve conservation of the properties of the substance P, the invention advantageously provides for the bag s being shaped as shown in FIGS. 5 and 6, i.e. having a sinuous flow circuit inside the bag itself for the substance P, and this is most easily done by interconnecting the facing faces of the bag along interdigitated weld lines such as $55_1$, $55_2$, and $55_3$, each of said weld lines extending over a portion only of the height of the bag as is clearly shown in FIG. 5 where the sinuous path is indicated by arrows f.

Figure 8:
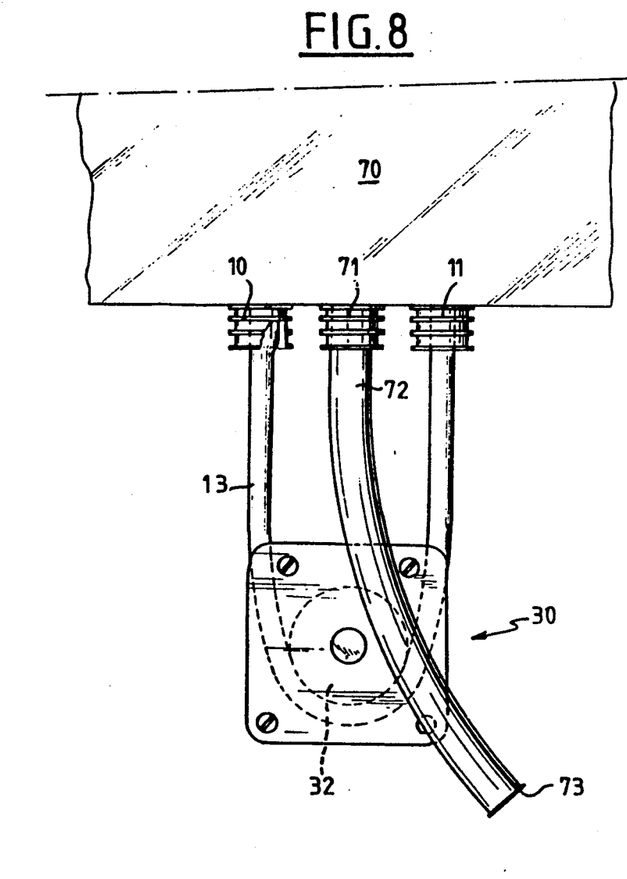
FIG. 8 is a fragmentary view on a larger scale of a portion of a bag suitable for installing in an installation of the invention, together with means of said installation.

In a preferred embodiment, the flexible bag, the flexible pipe or tube along which the substance circulates outside the bag, the dispensing duct, and the endpieces are all made in the embodiment, as shown in FIG. 8, the bag 70 constituted by a flexible envelope whose facing faces are locally interconnected by lines of welding in order to establish the sinuous path along which the substance P flows has its endpieces 10 and 11 heat welded thereto close together. The respective ends of the flexible tube 13 are also fixed to the endpieces 10 and 11, advantageously by hot-welding, with the tubes being suitable for co-operating with the rotor 32 of the peristaltic pump 30. Substantially halfway between the endpieces 10 and 11, there is a third endpiece 71 likewise fixed to the bag 70 by hot-welding, and it is this endpiece which is fixed in sealed manner to the end 72 of the duct 51 whose other end 73 is sealed until the bag filled with substance to be dispensed has been put into probe the dispensing apparatus.

Figure 7:
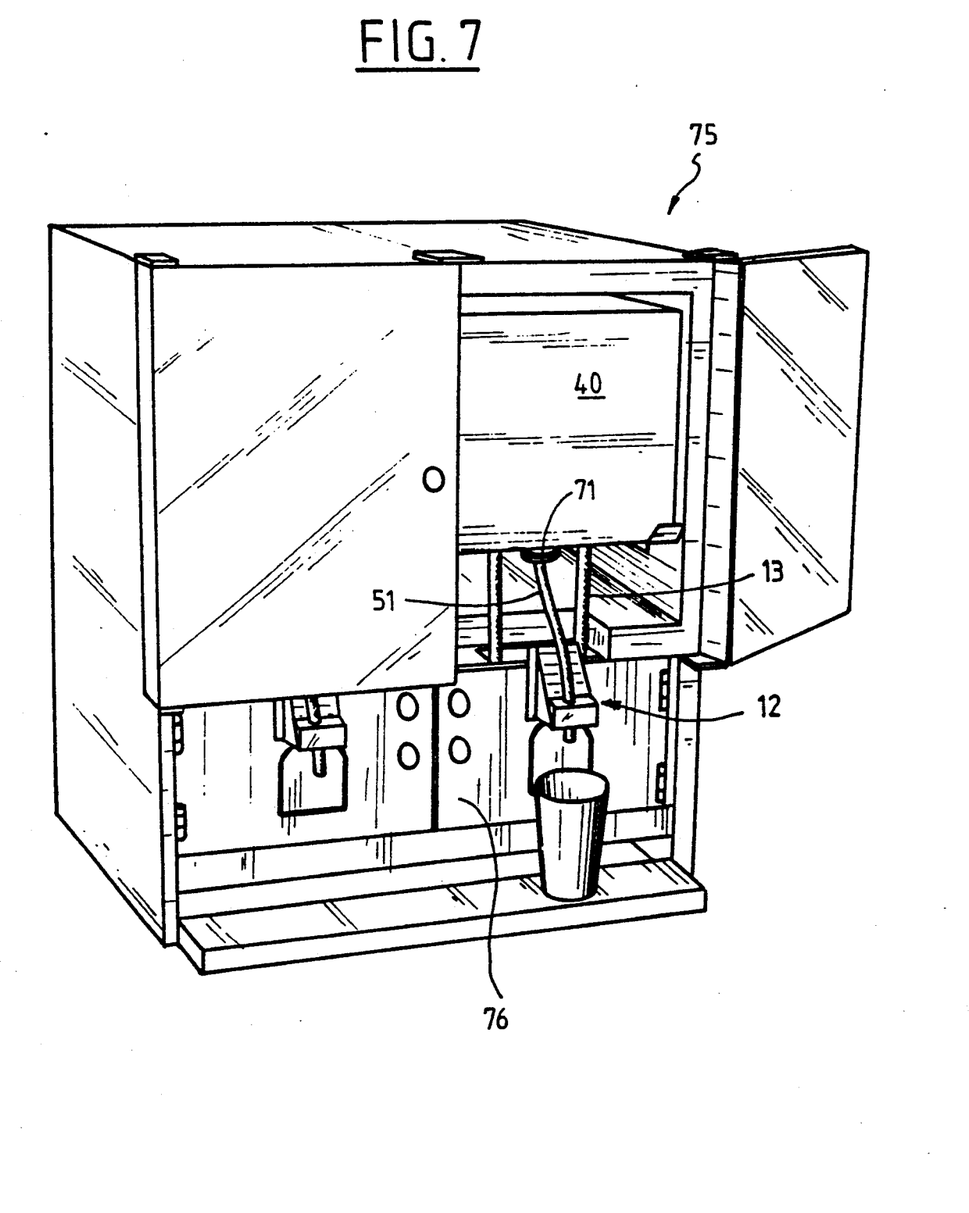
FIG. 7 is a perspective view of a preferred embodiment of an installation of the invention.

When the apparatus is designed to make use of bags of the type described above, its overall appearance is as shown in FIG. 7, i.e. it comprises a cabinet 75 suitable for receiving two boxes 40 each containing a refill 70 (i.e. a supply in a flexible bag) having respective ducts 51 running therefrom and co-operating with drawing-off means 12, while the flexible pipe 13 co-operates with the peristaltic pump hidden behind a flap 76.

Figure 9:
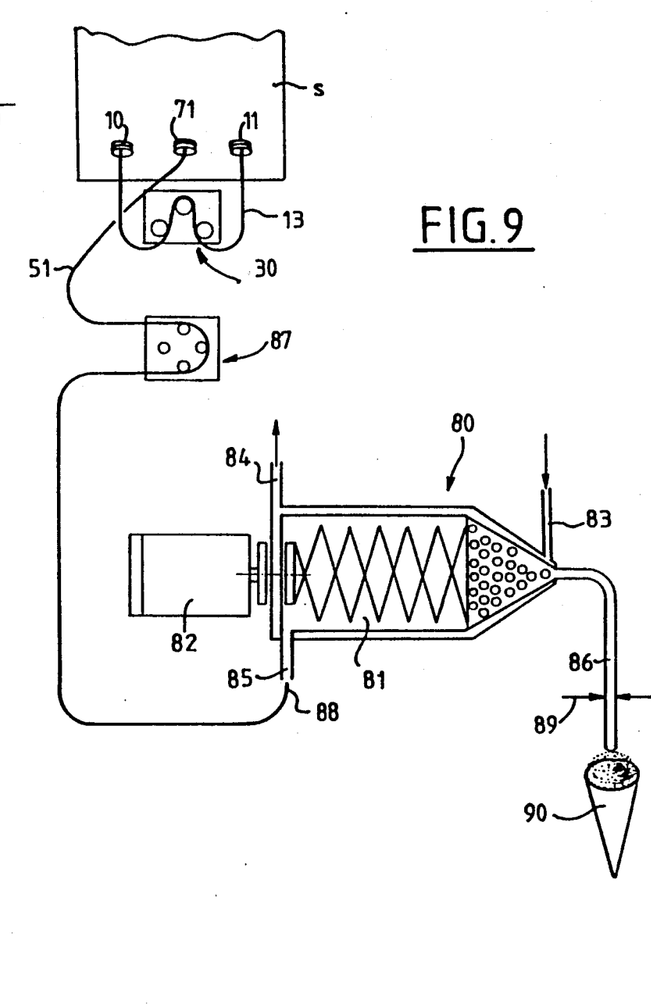
FIG. 9 is a diagrammatic view of a portion of another embodiment of an installation of the invention.

In the embodiment shown in FIG. 9, the installation of the type described above further includes means 80 for changing the texture and/or the thickness and/or the organoleptic properties of the substance dispensed relative to the properties of the substance stored in the bag s In the embodiment described and shown, these means comprise an expander reactor 81 driven by a motor 82. The reactor 81 is associated with a refrigerating circuit, e.g. a circuit containing water and glycol at $-5°$ C. and flowing as a counterflow to the substance to be dispensed, with the coolant flowing via an inlet 83 and an outlet 84, whereas the substance P arrives via an inlet 85 level with the coolant outlet 84 and leaves via an outlet 86 in the form of an expanded product in the vicinity of the inlet 83 for cold glycol-containing water.

In this embodiment, after the flexible pipe or tube outside the bag s has been caused to co-operate with the peristaltic pump 30, the drawing-off duct 51 (which is longer than in the preceding embodiments) is also caused to co-operate with a peristaltic pump 87 prior to being connected at its end 88 to the inlet 85 of the expansion reactor 80.

An installation of the invention including the means described above is then capable, when the contents of the bag s is liquid or semi-liquid yogurt, for example, of dispensing individual portions 90 of frozen yogurt via the drawing-off means shown diagrammatically by double-headed arrow 89, in a manner which is simple, safe, and hygienic.

I claim:

1. A dispensing installation for conserving and dispensing a liquid of semi-liquid fluid comprising:
   a deformable, flexible hygienically and aseptically sealed bag,
   a liquid or semi-liquid fluid contained in and substantially filling the bag and being hygienically and aseptically sealed therein,
   first and second spaced apart end pieces provided on said bag, each end piece having an orifice communicating with the interior of the bag,
   a fluid transport tube extending outside the bag and having opposite ends connected to said end pieces and communicating with the orifices and with the bag interior so as to form a closed liquid and gas tight fluid circuit outside said bag,
   a fluid outlet duct provided in said bag, said duct having one end communicating with the interior of the bag and having its opposite end extending from the bag and being sealed prior to any dispensing of the fluid but adapted for being opened for allowing the fluid to be dispensed, and
   a pump cooperating with said tube for pumping fluid contained in the bag from the bag, through the tube, and then back into the bag, so that the fluid characteristics such as the texture, thickness and organoleptic characteristics of the fluid are preserved.

2. A dispensing installation according to claim 1 including a box in which said flexible bag is received, said box including a opening through which said fluid outlet extends.

3. A dispensing installation according to claim 1 including an aseptic barrier positioned outside said bag and cooperating with said fluid outlet for preventing contamination of the fluid outlet.

4. A dispensing installation for conserving and dispensing a liquid or semi-liquid fluid comprising:
- a deformable, flexible hygienically and atypical sealed bag having opposing faces and weld lines interconnecting said opposing faces of said bag to define s sinuous circulation path for fluid contained in the bag,
- a liquid or semi-liquid fluid contained in and substantially filling the bag and being hygienically and aseptically sealed therein,
- a fluid transport tube extending outside the bag and having end portions connected to the bag and communicating with the bag interior so as to form a closed liquid and gas tight fluid circuit outside said bag,
- a fluid outlet duct provided in said bag, said duct having one end communicating with the interior of the bag and having its opposite end extending from the bag and being sealed prior to any dispensing of the fluid but adapted for being opened for allowing the fluid to be dispensed, and
- a pump cooperating with said tube for pumping any fluid contained in the bag from the bag, through the tube and then back into the bag, so that the fluid characteristics such as the texture, thickness and organoleptic characteristics are preserved.

5. A dispensing installation for conserving and dispensing a liquid or semi-liquid fluid comprising:
- a deformable, flexible hygienically and aseptically sealed bag,
- a liquid or semi-liquid fluid contained in and substantially filling the bag and being hygienically and aseptically sealed therein,
- a fluid transport tube extending outside the bag and having end portions connected to the bag and communicating with the bag interior so as to form a closed liquid and gas tight liquid circuit outside said bag,
- a fluid outlet duct provided in said bag, said duct having one end communicating with the interior of the bag and having its opposite end extending from eh bag and being sealed prior to any dispensing of the fluid but adapted for being opened for allowing the fluid to be dispensed,
- temperature control means cooperating with said tube between said end portions thereof for heating or cooling fluid pumped through said tube, and
- a pump cooperating with said tube for pumping fluid contained int h bag from the bag, through the tube and then back into the bag, so that the fluid characteristics such as the texture, thickness and organoleptic characteristics are preserved.

6. A dispensing installation for conserving and dispensing a liquid or semi-liquid fluid comprising:
- a deformable, flexible hygienically and aseptically sealed bag,
- a liquid or semi-liquid fluid contained in and substantially filling the bag and being hygienically and aseptically sealed therein,
- a fluid transport tube extending outside the bag and having end portions connected to the bag and communicating with the bag interior so as to form a closed liquid and gas tight liquid circuit outside said bag,
- a fluid outlet duct provided in said bag, said duct having one end communicating with the interior of the bag and having its opposite end extending from the bag and being sealed prior to any dispensing of the fluid but adapted for being opened for allowing the fluid to be dispensed,
- a pump cooperating with said tube for pumping fluid contained in the bag from the bag, through the tube and hen back into the bag, so hat the fluid characteristics such as the texture, thickness nd organoleptic characteristics are preserved, and
- means positioned outside said bag and associated with said fluid outlet duct for modifying he fluid characteristics such as the texture, thickness and organoleptic characteristics of the fluid after the fluid dispensed from the bag.

7. A dispensing installation according to claim 6 wherein said modifying means include an expansion reactor and cooling circuit.

8. A flexible bag adapted for sue in dispensing installations and for conserving and dispensing a liquid or semi-liquid fluid such as yogurt contained therein comprising:
- a deformable, flexible hygienically and aseptically sealed bag,
- a liquid or semi liquid fluid contained in and substantially filling the bag and being hygienically an aseptically sealed therein,
- first and second spaced-apart end pieces carried by said bag, each end piece having an orifice communicating with the interior of said bag,
- a fluid transport tube extending outside said bag and having opposite ends connected to said first and second end pieces and communicating with said orifices and with the interior of said bag so as to form a closed liquid and gas tight fluid circuit, and
- a fluid outlet duct provided in said bag, said duct having one end communicating with the interior of the bag and having its opposite end extending from he gab and being sealed prior to any dispensing of the liquid but adapted for being opened for allowing the fluid to be dispensed.

9. A bag according t claim 8 wherein said fluid outlet is connected to one of said end pieces and communicates with the orifice of said end piece.

10. A flexible bag according to claim 8 including a third end piece carried by said bag and spaced from said fist second end pieces, said fluid outlet being connected to said third end piece for allowing the fluid to be dispensed.

11. A refill bag adapted for use in dispensing installations and for conserving and dispensing a liquid or semi-liquid fluid such as yogurt contained therein comprising:
- a deformable, flexible hygienically and aseptically sealed bag having opposing faces and weld lines interconnecting opposing faces of said bag for defining a sinuous circulation path for fluid contained in the bag,
- a fluid or semi liquid fluid contained in and substantially filling the bag and being hygienically and aseptically sealed therein, a fluid transport tube extending outside said bag and having end portions connected to the bag and communicating with th bag interior so as to form a closed fluid circuit outside said bag, and a fluid outlet duct provided in said bag, said duct having one end communicating with the interior of the bag and having its opposite end extending from the bag and being sealed prior to any dispensing of the fluid but adapted for being opened for allowing the fluid to be dispensed.

12. A method of conserving and dispensing a liquid or semi-liquid fluid comprising th steps of:

providing a deformable, flexible bag, said bag having a fluid transport tube extending outside the bag and having ends connected to said bag and communicating with the interior of the bag for forming a closed fluid circuit, and a fluid outlet provided in the bag for allowing he fluid to be dispensed, filling he bag with a liquid or semi-liquid fluid, hygienically and aseptically sealing the bag with the liquid or semi-liquid fluid contained therein and filling the bag, installing the filled hygienically and aseptically sealed bag in a dispensing unit, connecting a pump to the fluid transport tube of said bag and circulating the fluid contained within the bag through the closed fluid circuit for conserving the fluid characteristic such as the texture, thickness and organoleptic characteristics of the fluid, unsealing the fluid outlet of th bag to break the hygienic and aseptic seal of he bag and permit dispensing of the liquid from the fluid outlet, and selectively dispensing fluid from the bag through the fluid outlet while maintaining circulation of the fluid through the closed fluid circuit.

13. The method according to claim 12 including the step of modifying the fluid characteristics such as the texture, thickness and organoleptic characteristics of the fluid after the fluid is drawn-off through he fluid outlet.

14. The method according of claim 12 including the step of subjecting the tube forming the closed fluid circuit to a temperature for cooling or heating he fluid while continuing to circulate the fluid through the tube.

15. A method of conserving and dispensing a liquid or semi-liquid fluid comprising the steps of:

providing a deformable, flexible bag, said bag having a fluid transport tube extending outside the bag and having ends connected to said bag and communicating with the interior of the bag for forming a closed fluid circuit, and a fluid outlet provided in the bag for allowing he fluid to be dispensed, filling he bag with a liquid or semi-liquid fluid, hygienically and aseptically sealing the bag with the liquid or semi-liquid fluid contained therein and filling h bag, installing the filled, hygienically and aseptically sealed bag in a dispensing unit, connecting a pump to the fluid transport tube of said bag and circulating the fluid contained within the bag through the closed fluid circuit for conserving he fluid characteristics such as the texture, thickness and organoleptic characteristics of the fluid, unselin the fluid outlet of th bag to break the hygienic and aseptic seal of the bag and permit dispensing of the liquid from the fluid outlet, and selectively dispensing fluid from the bag through the fluid outlet in individual portions while modifying he texture f the dispensed portions.

* * * * *

UNITED STATES PATENT AND TRADEMARK OFFICE
CERTIFICATE OF CORRECTION

PATENT NO. : 5,114,045

DATED : May 19, 1992

INVENTOR(S) : Michel Herpe

Page 1 of 2

It is certified that error appears in the above-identified patent and that said Letters Patent is hereby corrected as shown below:

On the Title page, item [57]

In the Abstract, line 2, "released" should be
-- enclosed --.

On the Title page, item [57]

In the Abstract, line 5, "dust" should be -- duct --.

Column 4, line 17, "a" should be -- s --.

Column 7, line 11, "atypical" should be
-- aseptically --.

Column 7, line 51, "eh" should be -- the --.

Column 7, line 58, "int h" should be -- in the --.

Column 8, line 46, "he gab" should be -- the bag --.

Column 8, line 47, "liquid" should be -- fluid --.

Column 8, line 49, "t" should be -- to --.

UNITED STATES PATENT AND TRADEMARK OFFICE
CERTIFICATE OF CORRECTION

PATENT NO. : 5,114,045
DATED     : May 19, 1992
INVENTOR(S) : Michel Herpe

It is certified that error appears in the above-identified patent and that said Letters Patent is hereby corrected as shown below:

Column 8, line 57, "refill" should be -- flexible --.

Column 8, line 66, "fluid" should be -- liquid --.

Column 10, line 29, "unselin" should be -- unsealing --.

Column 10, line 34, "f" should be -- of --.

Signed and Sealed this

Seventeenth Day of August, 1993

Attest:

BRUCE LEHMAN

Attesting Officer   Commissioner of Patents and Trademarks